United States Patent
Kang et al.

(10) Patent No.: US 10,451,452 B2
(45) Date of Patent: Oct. 22, 2019

(54) DISPLAY APPARATUS HAVING INDICATOR NEEDLE

(71) Applicant: SAMSUNG DISPLAY CO., LTD., Yongin-si, Gyeonggi-do (KR)

(72) Inventors: Ki-Nyeng Kang, Seoul (KR); Mu-Gyeom Kim, Hwaseong-si (KR); Min-Soo Kim, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 379 days.

(21) Appl. No.: 15/226,040

(22) Filed: Aug. 2, 2016

(65) Prior Publication Data

US 2017/0211953 A1    Jul. 27, 2017

(30) Foreign Application Priority Data

Jan. 27, 2016   (KR) .................. 10-2016-0010202

(51) Int. Cl.
| | |
|---|---|
| *G01D 13/24* | (2006.01) |
| *G04C 5/00* | (2006.01) |
| *G01D 13/04* | (2006.01) |
| *G09G 3/00* | (2006.01) |

(52) U.S. Cl.
CPC ............ *G01D 13/24* (2013.01); *G01D 13/04* (2013.01); *G09G 3/00* (2013.01); *G04C 5/00* (2013.01); *G04C 5/005* (2013.01)

(58) Field of Classification Search
CPC ........... G01D 13/24; G04C 5/00; G04C 5/005
USPC .............. 116/62.1, 62.4, 204, 284, 286–290, 116/292–294, 303
See application file for complete search history.

(56) References Cited

U.S. PATENT DOCUMENTS

| | | | | |
|---|---|---|---|---|
| 2,371,511 A | * | 3/1945 | Faus ..................... | G01D 5/02 116/228 |
| 2,463,414 A | * | 3/1949 | Nelson .................. | G01L 19/08 73/382 R |
| 2,757,364 A | * | 7/1956 | Hood .................... | G01F 15/066 116/204 |
| 3,058,294 A | * | 10/1962 | Zemla ................... | G04B 5/14 310/103 |
| 3,233,400 A | * | 2/1966 | Haydon ................. | G04C 11/00 116/301 |
| 3,465,511 A | * | 9/1969 | Held ..................... | G04C 3/066 368/158 |
| 3,465,512 A | * | 9/1969 | Usui ..................... | G04B 11/005 368/285 |
| 3,487,629 A | * | 1/1970 | Mochizuki ............. | G04C 3/06 318/132 |
| 3,595,010 A | * | 7/1971 | Kaiser ................... | G04B 19/00 116/204 |

(Continued)

FOREIGN PATENT DOCUMENTS

| | | |
|---|---|---|
| KR | 10-2008-0058246 A | 6/2008 |
| KR | 10-2010-0009772 A | 1/2010 |
| KR | 10-1531208 B1 | 6/2015 |

*Primary Examiner* — Justin Seo
*Assistant Examiner* — Tania C Courson
(74) *Attorney, Agent, or Firm* — Kile Park Reed & Houtteman PLLC

(57) ABSTRACT

A display apparatus includes a display panel, a needle module on the display panel, the needle module including an indicator needle rotatable with respect to a rotation axis, and a driving module to rotate the indicator needle via magnetic force.

12 Claims, 8 Drawing Sheets

(56) References Cited

U.S. PATENT DOCUMENTS

| | | | | |
|---|---|---|---|---|
| 3,618,311 | A * | 11/1971 | Wiesner et al. | G04C 3/04 318/130 |
| 3,646,750 | A * | 3/1972 | Reich | G04C 3/065 310/36 |
| 3,701,252 | A * | 10/1972 | Okamoto | G04B 45/0007 116/293 |
| 3,712,046 | A * | 1/1973 | Dill | G04B 19/20 340/815.64 |
| 3,775,963 | A * | 12/1973 | Clapham | G04C 3/14 368/85 |
| 3,877,215 | A * | 4/1975 | Burckhardt | G04B 17/025 331/175 |
| 4,090,131 | A * | 5/1978 | Mas | G01R 5/16 324/146 |
| 4,186,609 | A * | 2/1980 | Baermann | G01P 3/4956 324/164 |
| 4,206,406 | A * | 6/1980 | Scannell | G01R 1/02 324/151 R |
| 4,507,961 | A * | 4/1985 | Stradella | G01F 23/62 116/229 |
| 4,973,905 | A * | 11/1990 | Neidhardt | G01P 3/495 324/164 |
| 5,319,527 | A * | 6/1994 | Murphy | G01D 11/28 116/288 |
| 5,684,761 | A * | 11/1997 | Chen | G04C 10/00 368/179 |
| 7,050,359 | B2 * | 5/2006 | Dagan | A47G 1/17 368/223 |
| 7,396,154 | B2 * | 7/2008 | Houlon | G04C 5/005 368/127 |
| 8,151,725 | B2 * | 4/2012 | Masuda | G01D 11/28 116/204 |
| 8,461,829 | B2 * | 6/2013 | Steinich | G01D 11/245 324/207.2 |
| 8,483,018 | B2 * | 7/2013 | Anderson | G09B 21/004 368/230 |
| 8,733,394 | B2 * | 5/2014 | Negre | A61M 27/006 137/551 |
| 8,757,824 | B2 * | 6/2014 | Baker | G01D 13/22 116/250 |
| 8,803,802 | B2 * | 8/2014 | Hatanaka | G05G 5/05 345/161 |
| 9,126,010 | B2 * | 9/2015 | Shah | F16K 37/0008 |
| 9,658,600 | B1 * | 5/2017 | Jeon | G04C 17/00 |
| 2003/0137901 | A1 * | 7/2003 | Tokoro | G01C 9/06 368/127 |
| 2008/0100173 | A1 * | 5/2008 | Komagata | H02K 1/2733 310/261.1 |
| 2010/0043697 | A1 * | 2/2010 | Masuda | G01D 13/22 116/288 |
| 2015/0014650 | A1 | 1/2015 | Lim et al. | |
| 2016/0070235 | A1 * | 3/2016 | Mignot | G04C 5/005 368/126 |

* cited by examiner

DISPLAY APPARATUS HAVING INDICATOR NEEDLE

CROSS-REFERENCE TO RELATED APPLICATION

Korean Patent Application No. 10-2016-0010202, filed on Jan. 27, 2016, in the Korean Intellectual Property Office, and entitled: "Display Apparatus Having Indicator Needle," is incorporated by reference herein in its entirety.

BACKGROUND

1. Field

Exemplary embodiments relate to a display apparatus having an indicator needle. More particularly, exemplary embodiments relate to a display apparatus having an indicator needle which is physically operated.

2. Description of the Related Art

Recently, a display apparatus having light weight and small size has been manufactured. A cathode ray tube (CRT) display apparatus, which had been used due to performance and competitive price, had a large size and low portability. Therefore, a display apparatus, e.g., a plasma display panel (PDP) apparatus, a liquid crystal display (LCD) apparatus, and an organic light emitting diode (OLED) display apparatus, has been highly regarded due to it small size, light weight, and low-power-consumption. For example, the display apparatus may be used for a smart watch and the like, e.g., the smart watch may display the clock hands on a display screen.

SUMMARY

One or more exemplary embodiments provide a display apparatus which has an indicator needle which is physically operated.

According to an exemplary embodiment, a display apparatus includes a display panel, a needle module disposed on the display panel comprising an indicator needle configured to rotate with respect to a rotation axis, and a driving module configured to rotate the indicator module using magnetic force.

In an exemplary embodiment, the needle module may include a first rotating part, a first magnet disposed in the first rotating part, a second rotating part and a second magnet disposed in the second rotating part. The indicator needle may include first and second needles which rotate according to rotation of the first and second rotating parts, respectively.

In an exemplary embodiment, the driving module may include a first rotating driving part, a first driving magnet disposed in the first rotating driving part, a second rotating driving part, and a second driving magnet disposed in the second rotating driving part.

In an exemplary embodiment, the first magnet may have a first-pole and a second-pole, and the second magnet has a first-pole and a second-pole. The first driving magnet may have a first-pole and a second-pole. The second driving magnet may have a first-pole and a second-pole. A net attractive force may be applied between the first-pole of the first magnet and the second-pole of the first driving magnet. A net attractive force may be applied between the first-pole of the second magnet and the second-pole of the second driving magnet, so that the first rotating part rotates when the first rotating driving part rotates, and the second rotating part rotates when the second rotating driving part rotates.

In an exemplary embodiment, a first axis portion may be formed at the first rotating part. A second axis portion may be formed at the second rotating part. The first axis portion and the second axis portion may be combined with each other configured to independently rotate about the rotation axis.

In an exemplary embodiment, the second rotating part may be disposed in the first rotating part.

In an exemplary embodiment, a line along a net attractive force between the first magnet of the first rotating part and the first driving magnet of the first rotating driving part and a line along a net attractive force between the second magnet of the second rotating part and the second driving magnet of the second rotating driving part may not cross each other.

In an exemplary embodiment, the first rotating part and the second rotating part may be disposed on the display panel in order. The second rotating part may be disposed between the first rotating part and the display panel.

In an exemplary embodiment, the needle module may further include a third rotating part and a third magnet disposed in the third rotating part.

In an exemplary embodiment, the display panel may include a display area which has a circular shape and a first peripheral area adjacent to and surrounding the display area. An image may be displayed on the display area.

In an exemplary embodiment, a second peripheral area may be disposed in the middle of the display area. An image may not be displayed in the second peripheral area. The needle module may be disposed on the second peripheral area with overlapping the second peripheral area.

In an exemplary embodiment, the driving module may be configured to move on a plane. The needle module may move on the display panel according to movement of the driving module.

In an exemplary embodiment, the display panel may be disposed between the needle module and the driving module. Any hole may not be formed through the display panel.

In an exemplary embodiment, the indicator needle may be a clock hand which is physically operated.

According to an exemplary embodiment, a display apparatus includes a circular display panel, a first rotating part disposed on an upper surface of the circular display panel, and connected to a first indicator needle, and a first rotating driving part disposed on a lower surface of the circular display panel configured to rotate the first rotating part using magnetic force.

In an exemplary embodiment, the display apparatus may further include a second rotating part disposed on the circular display panel, and connected to a second indicator needle, and a second rotating driving part disposed on the lower surface of the circular display panel configured to rotate the second rotating part using magnetic force. The first and second rotating parts may rotate about a rotation axis. The first and second indicator needles may represent hour and minute of a clock, respectively.

In an exemplary embodiment, the display apparatus may further include a third rotating part disposed on the circular display panel, and connected to a third indicator needle, and a third rotating driving part disposed on the lower surface of the circular display panel configured to rotate the third rotating part using magnetic force. The third rotating part may rotate about the rotation axis. The third indicator needle may represent second of the clock.

In an exemplary embodiment, a line along a net attractive force between the first rotating part and the first rotating driving part and a line along a net attractive force between the second rotating part and the second rotating driving part may not cross each other.

In an exemplary embodiment, the first rotating driving part may be configured to move on the lower surface of the circular display panel and the first rotating part moves on the upper surface of the display panel according to movement of the first rotating driving part.

In an exemplary embodiment, the first rotating driving part may be disposed in the middle of the circular display panel in a clock mode. The first rotating driving part may move to a side out of the middle in a display mode.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
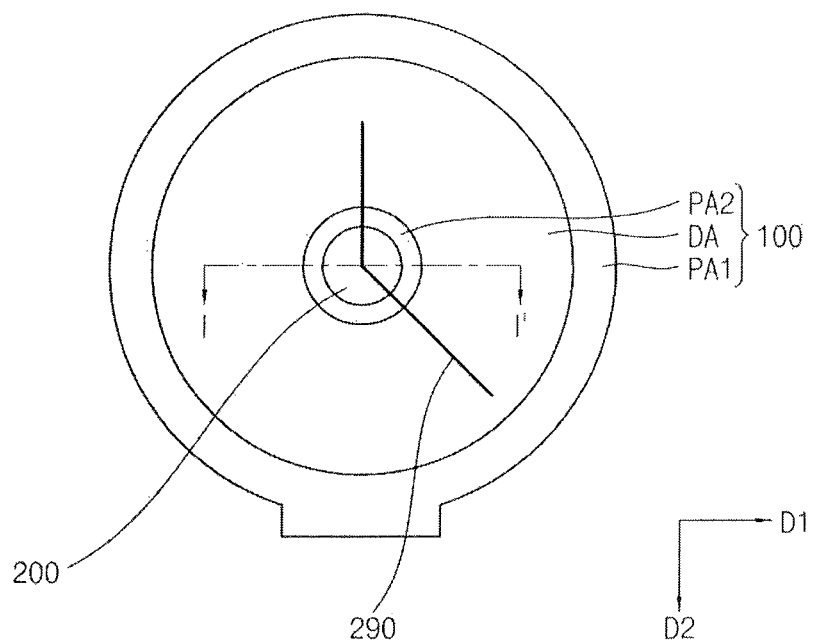
FIG. 1 illustrates a plan view of a display apparatus according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, embodiments will be explained in detail with reference to the accompanying drawings.

Figure 2:
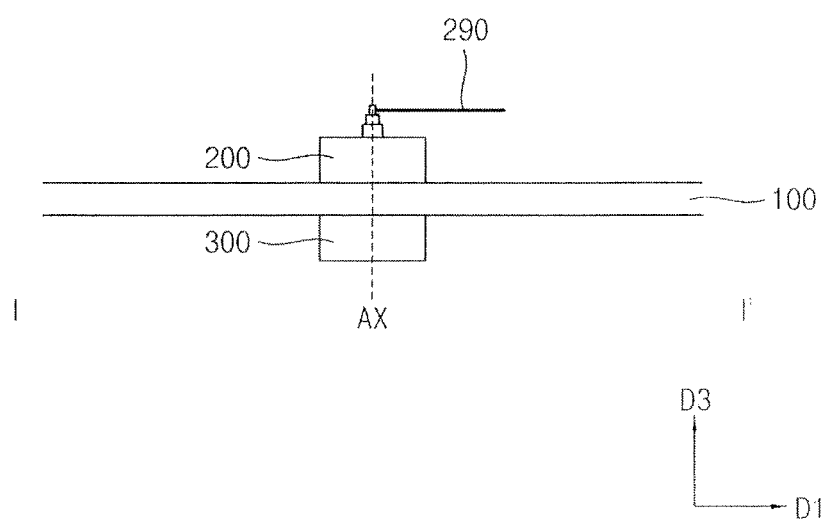
FIG. 2 illustrates a cross-sectional view taken along a line I-I' of FIG. 1.
Figure 3:
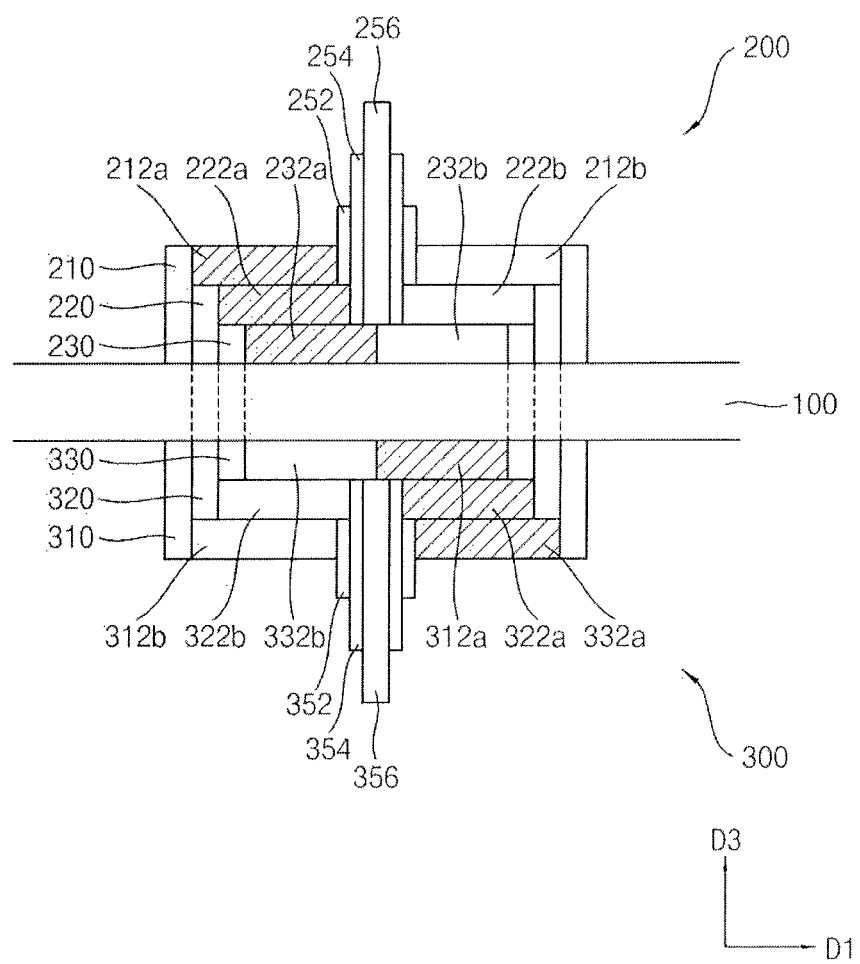
FIG. 3 illustrates cross-sectional view of a needle module and a driving module of the display apparatus in detail.
Figure 4:
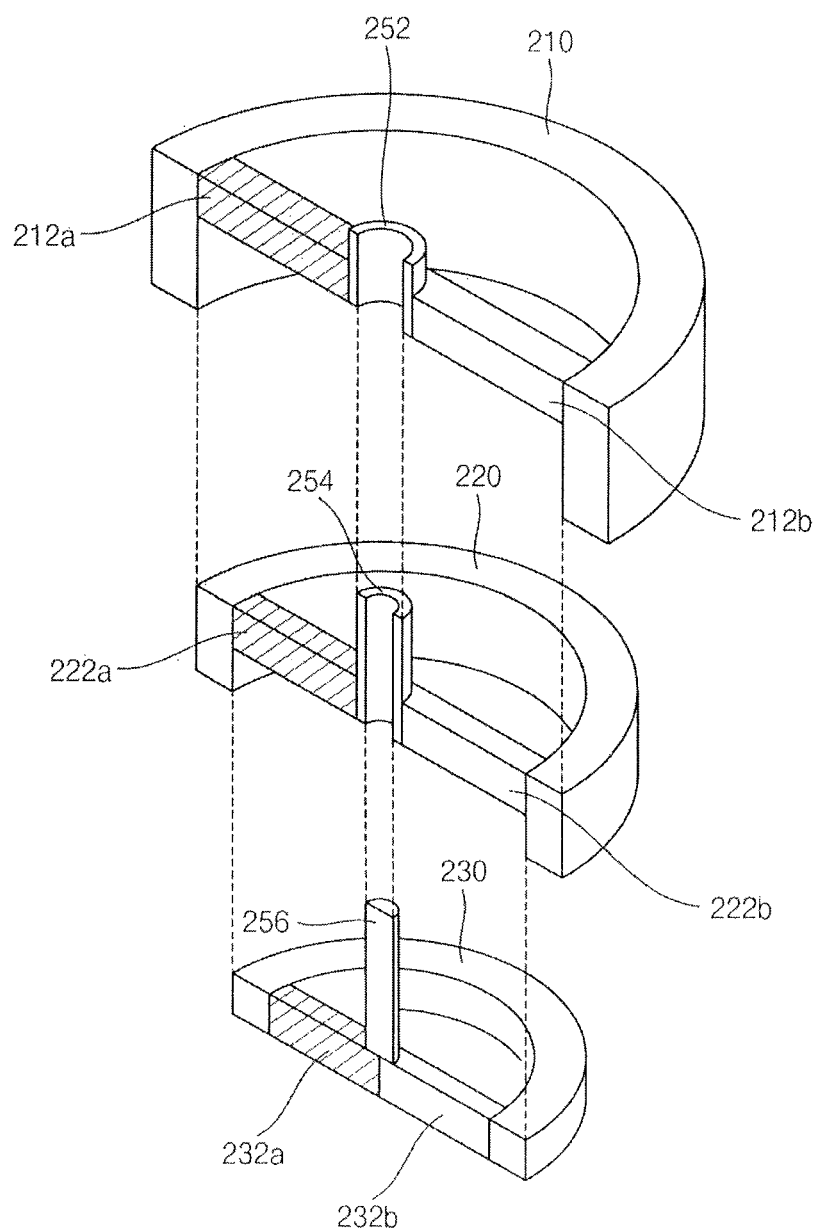
FIG. 4 illustrates an exploded perspective cross-sectional view of the needle module of FIG. 3.
Figure 4:
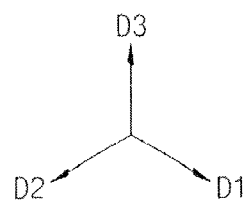

FIG. 1 is a plan view illustrating a display apparatus according to an exemplary embodiment. FIG. 2 is a cross-sectional view taken along a line I-I' of FIG. 1. FIG. 3 is cross-sectional view illustrating a needle module and a driving module of the display apparatus in detail. FIG. 4 is an exploded perspective cross-sectional view illustrating the needle module of FIG. 3.

Referring to FIGS. 1 to 4, a display apparatus may include a display panel 100, a needle module 200, and a driving module 300.

The display panel 100 may include a display area DA and a first peripheral area PA1 and a second peripheral area PA2 which are adjacent to the display area DA. The display area DA, the first peripheral area PA1, and the second peripheral area PA2 may be disposed on a plane which is formed by a first direction D1 and a second direction D2 crossing the first direction D1. The second direction D2 may be substantially perpendicular to the first direction D1. An image may be displayed on the display area DA, e.g., the display area DA may have a circle shape. The first peripheral area PA1 may surround, e.g., the entire perimeter of, the display area DA. The second peripheral area PA2 may be disposed at a center of the display area DA, so that the display area DA may have a donut shape. A driving circuit and wirings for driving the display panel 100 may be disposed in the first and second peripheral areas PA1 and PA2 to display the image in the display area DA.

The display panel 100 may have various structures as required. There is no hole at the display panel 100 where the needle module 200 is disposed, so that an additional process at the display panel 100 for installing the needle module is not required. That is, as illustrated in FIG. 2, the needle module 200 may be disposed on, e.g., directly on, an upper surface of the display panel 100.

In detail, referring to FIGS. 3-4, the needle module 200 may include a first rotating part 210, first-pole and second-pole of a first magnet 212a and 212b, a second rotating part 220, first-pole and second-pole of a second magnet 222a and 222b, a third rotating part 230, first-pole and second-pole of a second magnet 232a and 232b, and a plurality of indicator needles 290 (FIG. 1). The indicator needles 290 may be connected to the first to third rotating parts 210, 220, and 230, respectively. As the first to third rotating parts 210, 220, and 230 physically rotate, the indicator needles 290 may physically rotate in accordance with the rotating parts, respectively.

For example, a number of the indicator needles 290 may equal a number of the rotating parts, so each indicator needle 290 may be connected to a separate rotating part of the first to third rotating parts 210, 220, and 230, thereby allowing independent rotation of each of the indicator needles 290 with respect to an independent rotation of each rotating part of the first to third rotating parts 210, 220, and 230. For example, the indicator needles 290 may be clock hands, and the display apparatus may be a display apparatus having clock hands which are physically operated.

Referring back to FIGS. 3-4, a first axis portion 252 may be formed at, e.g., a center of, the first rotating part 210, so that the first rotating part 210 may rotate about an axis of rotation AX (FIG. 2). The first axis portion 252 may be combined with a second axis portion 254 of the second rotating part 220 and with a third axis portion 256 of the third rotating part 230, so that the first rotating part 210, the second rotating part 220, and the third rotating part 230 may be rotated about the axis of rotation AX. For example, as illustrated in FIG. 3, the third axis portion 256 may be inserted into the second axis portion 254, which in turn, is inserted together with the third axis portion 256 into the first axis portion 252, while the first through third rotating parts 210 through 230 may be stacked on top of each other.

The first magnet may be disposed in the first rotating part 210. The first magnet may include the first-pole 212a and the second-pole 212b. The first-pole 212a of the first magnet may be aligned with a second-pole 312b of a first driving magnet of a first rotating driving part 310 of the driving module 300. Thus, when the second-pole 312b of the first driving magnet of the first rotating driving part 310 of the driving module 300 rotates about the rotation axis AX, the first-pole 212a rotates about the rotation axis AX by a net attractive force between the second-pole 312b and the first-pole 212a, so that the first rotating part 210 may be rotated. Accordingly, the indicator needle, which is connected to the first axis portion 252 of the first rotating part 210 or the first rotating part 210 itself, may be rotated.

The second axis portion 254 may be formed at the second rotating part 220, so that the second rotating part 220 may rotate about the axis of rotation AX. The second axis portion 254 may be combined with the first axis portion 252 of the first rotating part 210 and the third axis portion 256 of the third rotating part 230, so that the first rotating part 210, the second rotating part 220, and the third rotating part 230 may be rotated about the axis of rotation AX.

As described in the figures, the second rotating part 220 may be disposed in the first rotating part 210. For example, an outer diameter of the second rotating part 220 may be smaller than an inner diameter of the first rotating part 210, so that the second rotating part 220 may be rotated independently of the first rotating part 210.

The second magnet may be disposed in the second rotating part 220. The second magnet may include the first-pole 222a and the second-pole 222b. The first-pole 222a of the second magnet may be aligned with a second-pole 322b of a second driving magnet of a second rotating driving part 320 of the driving module 300. Thus, when the second-pole 322b of the second driving magnet of the second rotating driving part 320 of the driving module 300 rotates about the rotation axis AX, the first-pole 222a rotates about the rotation axis AX by a net attractive force between the second-pole 322b and the first-pole 222a, so that the second rotating part 220 may be rotated. Accordingly, the indicator needle, which is connected to the second axis portion 254 of the second rotating part 220 or the second rotating part 220 itself, may be rotated.

The third axis portion 256 may be formed at the third rotating part 230, so that the third rotating part 230 may rotate about the axis of rotation AX. The third axis portion 256 may be combined with the first axis portion 252 of the first rotating part 210 and the second axis portion 254 of the second rotating part 220, so that the first rotating part 210, the second rotating part 220 and the third rotating part 230 may be rotated about the axis of rotation AX.

As described in the figures, the third rotating part 230 may be disposed in the second rotating part 220. For example, an outer diameter of the third rotating part 230 may be smaller than an inner diameter of the second rotating part 220, so that the third rotating part 230 may be rotated independently of the second rotating part 220.

The third magnet may be disposed in the third rotating part 230. The third magnet may include the first-pole 232a and the second-pole 232b. The first-pole 232a of the third magnet may be aligned with a second-pole 332b of a third driving magnet of a third rotating driving part 330 of the driving module 300. Thus, when the second-pole 332b of the third driving magnet of the third rotating driving part 330 of the driving module 300 rotates about the rotation axis AX, the first-pole 232a rotates about the rotation axis AX by a net attractive force between the second-pole 332b and the first-pole 232a, so that the third rotating part 230 may be rotated. Accordingly, the indicator needle, which is connected to the third axis portion 256 of the third rotating part 230 or the third rotating part 230 itself, may be rotated.

The driving module 300 may be disposed on a lower surface of the display panel 100, e.g., the driving module 300 and the needle module 200 may be on opposite surfaces of the display panel 100. Thus, the display panel 100 may be disposed between the needle module 200 and the driving module 300.

The driving module 300 may include the first rotating driving part 310, the second rotating driving part 320, and the third rotating driving part 330. In detail, the driving module 300 may include the first rotating driving part 310, the first-pole 312a and second-pole 312b of the first driving magnet, the second rotating driving part 320, the first-pole 322a and second-pole 322b of the second driving magnet, the third rotating driving part 330, and the first-pole 332a and second-pole 332b of the third driving magnet.

A first driving axis portion 352 may be formed at the first rotating driving part 310, so that the first rotating driving part 310 may rotate about the axis of rotation AX. The first driving axis portion 352 may be combined with a second driving axis portion 354 of the second rotating driving part 320 and with a third driving axis portion 356 of the third rotating driving part 330, so that the first rotating driving part 310, the second rotating driving part 320, and the third rotating driving part 330 may be rotated about the axis of rotation AX.

The second driving axis portion 354 may be formed at the second rotating driving part 320, so that the second rotating driving part 320 may rotate about the axis of rotation AX. The second driving axis portion 354 may be combined with the first driving axis portion 352 of the first rotating driving part 310 and with the third driving axis portion 356 of the third rotating driving part 330, so that the first rotating driving part 310, the second rotating driving part 320 and the third rotating driving part 330 may be rotated about the axis of rotation AX.

Referring again to FIG. 3, net attractive force may be applied along a dotted line in the figure. When the first to third rotating parts 210, 220 and 230 of the needle module 200 rotate, circles which are respectively drawn by the net attractive forces may not overlap each other. For example, as illustrated in FIG. 3, net attractive forces may be formed between, e.g., entire, third rotating parts 230 and 330, while net attractive forces may be formed, e.g., only, between outer edges of the second rotating parts 220 and 320 that extend beyond respective third rotating parts 230 and 330. Accordingly, the first to third rotating parts 210, 220 and 230 may be rotated independent of each other.

Although not shown in the figures, the display apparatus may further include a driving device configured to independently rotate the first rotating driving part 310, the second rotating driving part 320, and the third rotating driving part 330 of the driving module 300 as required. The driving device may be embodied by a traditional technology. For example, a motor, actuator, a magnet force may be used to embody it, e.g., to operate a clock. The driving device may have various configurations to physically rotate the first rotating driving part 310, the second rotating driving part 320, and the third rotating driving part 330.

Figure 5:
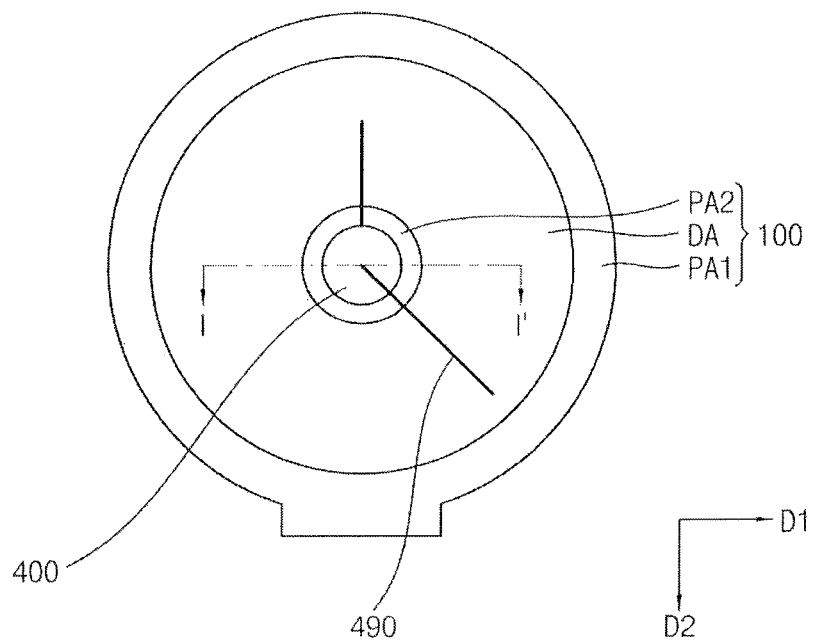
FIG. 5 illustrates a plan view of a display apparatus according to an exemplary embodiment.
Figure 6:
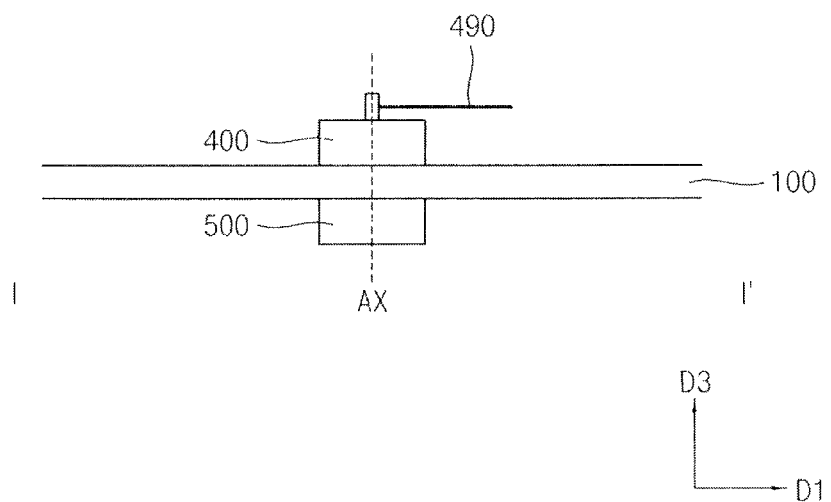
FIG. 6 illustrates a cross-sectional view taken along a line I-I' of FIG. 5.
Figure 7:
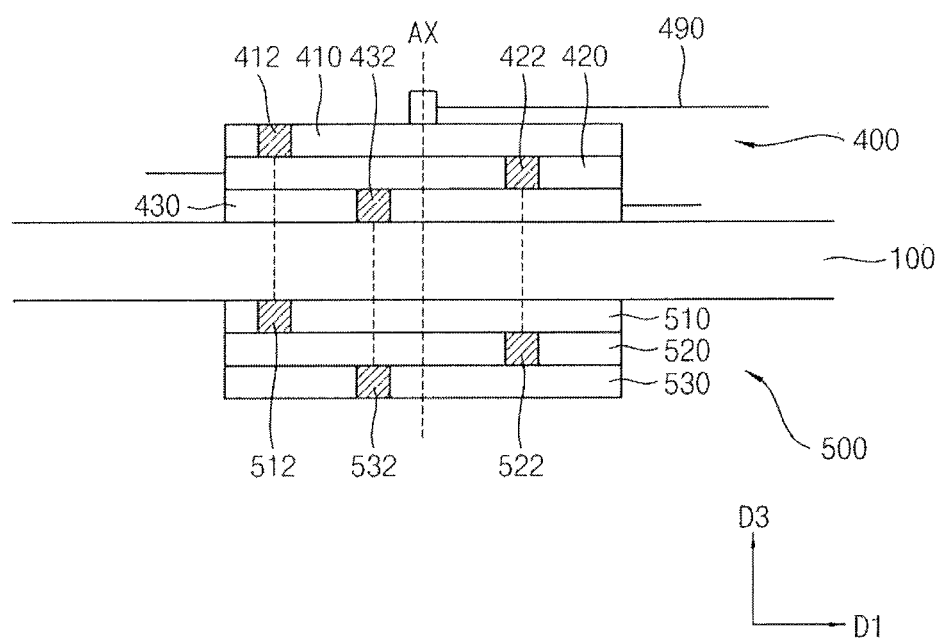
FIG. 7 illustrates an exploded perspective cross-sectional view of the needle module of FIG. 6.
Figure 8:
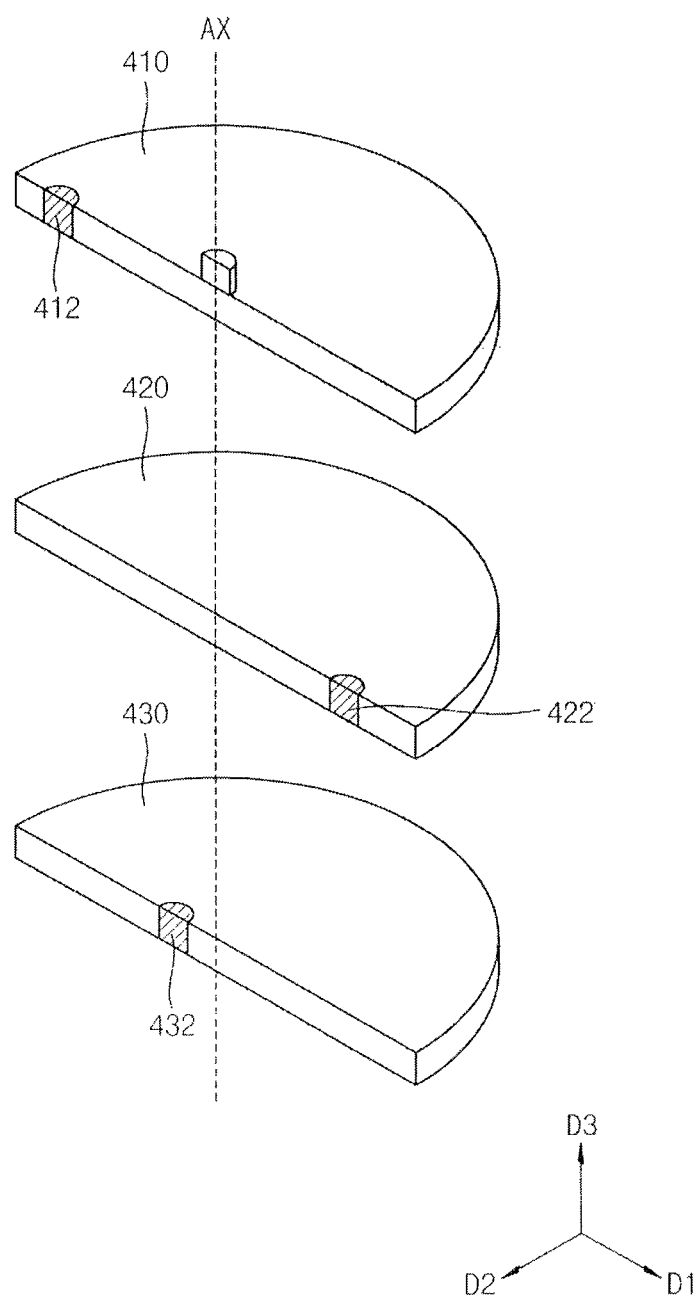
FIG. 8 illustrates an exploded perspective cross-sectional view of the needle module of FIG. 7.

FIG. 5 is a plan view illustrating a display apparatus according to an exemplary embodiment. FIG. 6 is a cross-sectional view taken along a line I-I' of FIG. 5. FIG. 7 is an exploded perspective cross-sectional view illustrating the needle module of FIG. 6. FIG. 8 is an exploded perspective cross-sectional view illustrating the needle module of FIG. 7.

Referring to FIGS. 5 to 8, the display apparatus may be substantially the same as the display apparatus of FIGS. 1 to 4, except for a needle model 400 and a driving module 500. Thus, any further detailed descriptions concerning the same elements will be briefly described or omitted.

The display apparatus may include a display panel 100, the needle model 400, and the driving module 500.

The display panel 100 may include the display area DA and he first peripheral area PA1 and the second peripheral area PA2 which are adjacent to the display area DA. The display area DA, the first peripheral area PA1, and the second peripheral area PA2 may be disposed on a plane which is formed by a first direction D1 and a second direction D2 crossing the first direction D1.

The needle module 400 may be disposed on an upper surface of the display panel 100. The needle module 400 may include a first rotating part 410, a first magnet 412, a second rotating part 420, a second magnet 422, a third rotating part 430, a third magnet 432, and a plurality of indicator needle 490. The indicator needles may be connected to the first to third rotating parts 410, 420 and 430, respectively. As rotating the first to third rotating parts 410, 420, and 430, the indicator needles may rotate, respectively. For example, the indicator needles may be clock hands, and the display apparatus may be a display apparatus having clock hands which are physically operated.

The first to third rotating parts 410, 420, and 430 may be disposed on an upper surface of the display panel 100 in order, e.g., sequentially. For example, the third rotating part 430 may be disposed on the upper surface of the display panel 100, the second rotating part 420 may be disposed on the third rotating part 430, and the first rotating part 410 may be disposed on the second rotating part 420. The first to third rotating parts 410, 420, and 230 may rotate about the rotation axis AX.

The first magnet 412 may be disposed in the first rotating part 410. The first magnet 412 may be aligned with a first driving magnet 512 of a first rotating driving part 510 of the driving module 500. Thus, when the first driving magnet 512 of the driving module 500 rotates about the rotation axis AX, the first magnet 412 may rotate about the rotation axis AX by a net attractive force between the first magnet 412 and the first driving magnet 512, so that the first rotating part 410 may be rotated. Accordingly, the indicator needle, which is connected to the first rotating part 410 may be rotated.

The second magnet 422 may be disposed in the second rotating part 420, e.g., the second magnet 422 may be horizontally spaced apart from the first magnet 412. The second magnet 422 may be aligned with a second driving magnet 522 of a second rotating driving part 520 of the driving module 500. Thus, when the second driving magnet 522 of the driving module 500 rotates about the rotation axis AX, the second magnet 422 may rotate about the rotation axis AX by a net attractive force between the second magnet 422 and the second driving magnet 522, so that the second rotating part 420 may be rotated. Accordingly, the indicator needle, which is connected to the second rotating part 420 may be rotated.

The third magnet 432 may be disposed in the third rotating part 430 e.g., the third magnet 432 may be horizontally spaced apart from each of the first and second magnets 412 and 422 to have a non-overlapping relationship among the first through third magnets 412 through 432. The third magnet 432 may be aligned with a third driving magnet 532 of a third rotating driving part 530 of the driving module 500. Thus, when the third driving magnet 532 of the driving module 500 rotates about the rotation axis AX, the third magnet 432 may rotate about the rotation axis AX by a net attractive force between the third magnet 432 and the third driving magnet 532, so that the third rotating part 430 may be rotated. Accordingly, the indicator needle, which is connected to the third rotating part 430 may be rotated.

The driving module 500 may include the first rotating driving part 510, the second rotating driving part 520, and the third rotating driving part 530. The first rotating driving part 510, the second rotating driving part 520, and the third rotating driving part 530 may be disposed on a lower surface of the display panel 100. For example, the first rotating driving part 510 may be disposed on the lower surface of the display panel 100, the second rotating driving part 520 may be disposed on first rotating driving part 510, and the third rotating driving part 530 may be disposed on second rotating driving part 520. The first to third rotating driving parts 510, 520 and 530 may rotate about the rotation axis AX.

The first driving magnet 512 may be disposed in the first rotating driving part 510. The second driving magnet 522 may be disposed in the second rotating driving part 520. The third driving magnet 532 may be disposed in the third rotating driving part 530.

Figure 9:
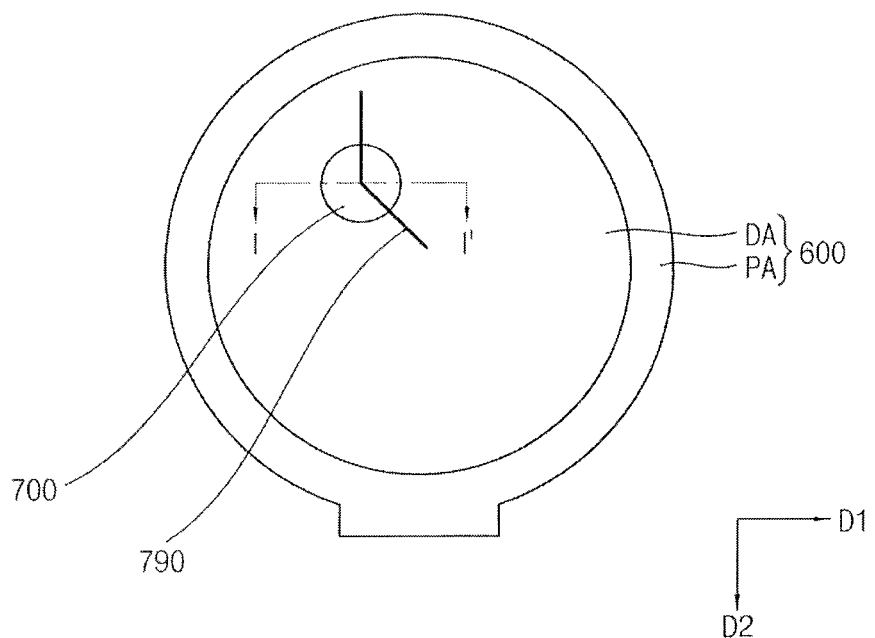
FIG. 9 illustrates a plan view of a display apparatus according to an exemplary embodiment.
Figure 10:
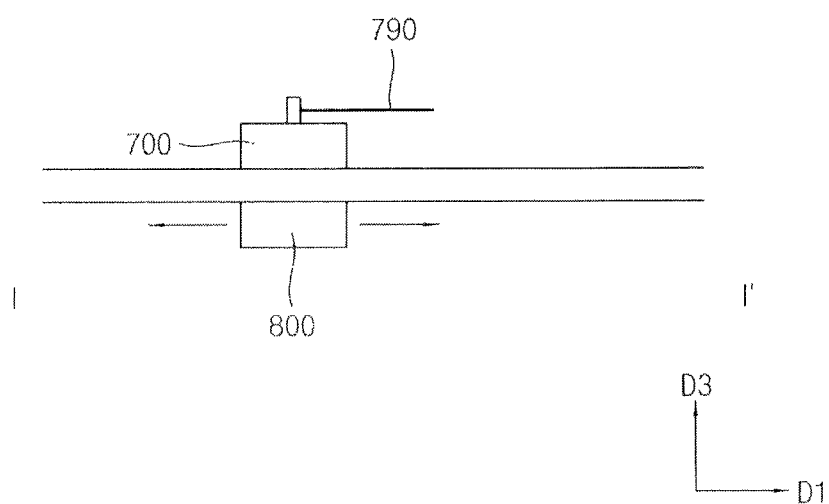
FIG. 10 illustrates a cross-sectional view taken along a line I-I' of FIG. 9.
Figure 11:
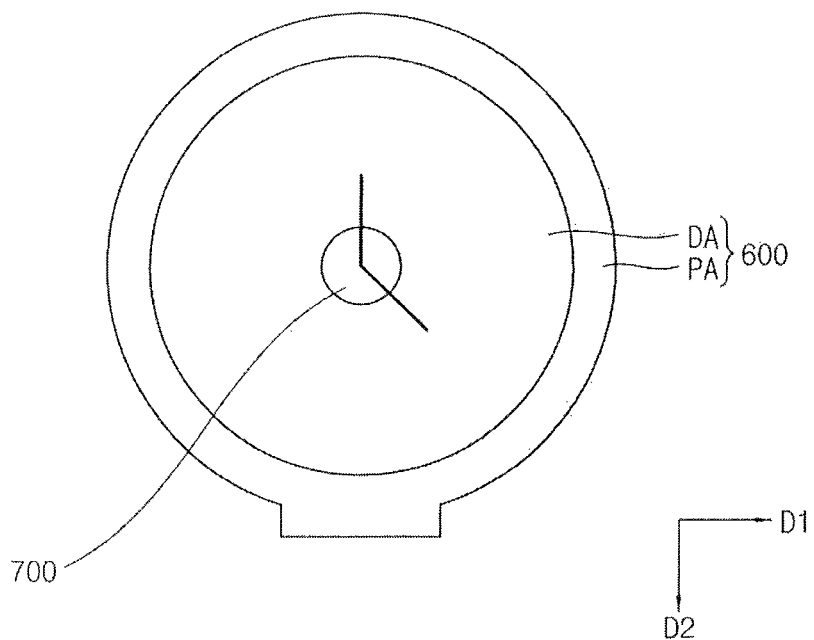
FIGS. 11 and 12 illustrate plan views to explain operation of the display apparatus of FIG. 9.
Figure 12:
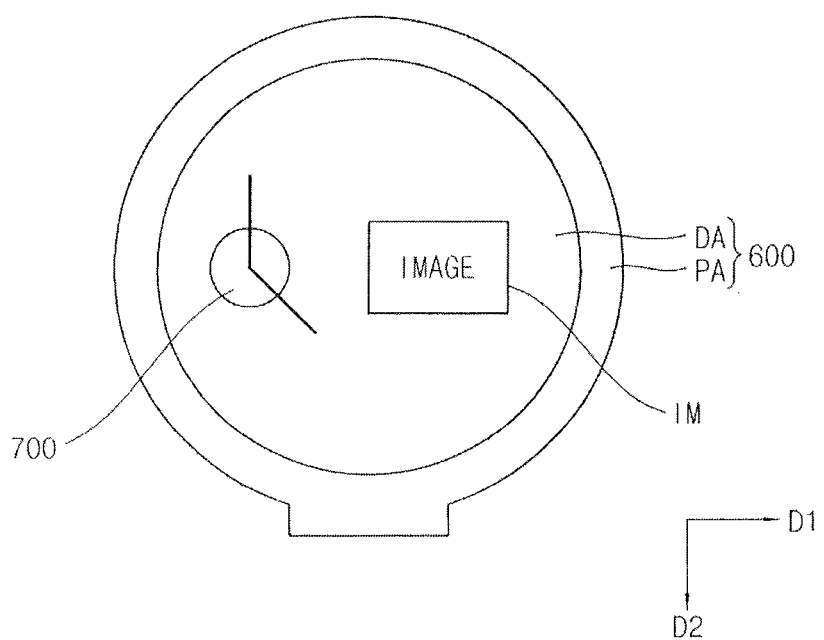

FIG. 9 is a plan view illustrating a display apparatus according to an exemplary embodiment. FIG. 10 is a cross-sectional view taken along a line I-I' of FIG. 9. FIGS. 11 and 12 are plan views to explain operation of the display apparatus of FIG. 9.

Referring to FIGS. 9 to 10, the display apparatus may be substantially the same as the display apparatus of FIGS. 1 to 4, except that a display panel does not have a second peripheral area in the middle, and a needle module 700 and a driving module 800 may move along the first direction D1 and the second direction D2. Thus, any further detailed descriptions concerning the same elements will be briefly described or omitted.

The display panel 600 may include the display area DA and a peripheral area PA which is adjacent to the display area DA and surrounds the display area DA. The display area DA and the peripheral area PA may be disposed on a plane which is formed by the first direction D1 and the second direction D2 which crosses the first direction D1.

The needle module 700 may be disposed on an upper surface of the display panel 600. The needle module 700 may include a plurality of indicator needles 790, each of which can rotate about an axis of rotation. For example, the indicator needles 790 may be clock hands, and the display apparatus may be a display apparatus having clock hands which are physically operated, e.g., the indicator needles 790 may be separate elements spaced apart from the display panel 600 and moveable independently of each other. Thus, the indicator needles 790 may represent hour, minute, and second, respectively.

The driving module 800 may be disposed on a lower surface of the display panel 600. The driving module 800 may physically rotate the indicator needles 790 of the needle module 700 using magnetic force as described previously. The driving module 800 may be moved along the first and second direction D1 and D2 on the surface of the display panel 600, e.g., to any location desired by the user. According to movement of the driving module 800, the needle module 700 may move along the first and second direction D1 and D2 on the display panel 600. For example, the driving module 800 and the needle module 700 may be secured to the display panel 600 and to each other via the magnetic forces.

Although not shown in the figures, the display apparatus may further include a driving device to move the driving module 800 along the first and second direction D1 and D2. The driving device may be embodied by a traditional technology. For example, a motor, actuator, a magnet force may be used to embody it. The driving device may have various configurations to move the driving module 800 along the first and second directions D1 and D2.

Referring to FIG. 11, the display apparatus may work in a clock mode. In the clock mode, the display panel 600 of the display apparatus may be off or may display an image. In the clock mode, the needle module 700 may be disposed in the middle of the display panel 600, i.e., the driving module 800 may be moved to the middle of the display panel 600, so that the display apparatus may be used as a typical clock.

Referring to FIG. 12, the display apparatus may work in a display mode. In the display mode, an image IM larger than a predetermined size may be displayed on the display panel 600. Here, the needle module 700 may be moved to one side from the middle, e.g., to a periphery of the displayed image, so that the image IM larger than the predetermined size may be displayed without being obscured by the needle module 700.

By way of summation and review, a display apparatus displaying a clock hand, which is physically operated, may require multiple processing stages. Such processing stages may include, e.g., forming a hole through the display panel to install the clock hands or forming a transparent display panel for the clock hand.

According to the present example embodiment, a display apparatus includes a display panel, a needle module having an indicator module, and a driving module configured to rotate the indicator needle using magnetic force. Accordingly, the display apparatus may be a display apparatus having clock hands which are physically operated or an indicator for an automobile dashboard. In addition, the indicator needle of the needle module is operated by magnetic force, so that there is no need of an additional process, i.e., no need to form a hole through the display panel to install the indicator needle. In addition, the needle module may move to different positions on the display panel as required, e.g., as it is operated by magnetic force and does not depend on a hole through the display panel. Although an image larger than predetermined size is displayed, the needle module may move to one side, e.g., periphery of the image, so that the image may be displayed without being obscured by the needle module.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display apparatus, comprising:
   a display panel;
   a needle module on the display panel, the needle module including an indicator needle rotatable with respect to a rotation axis; and
   a driving module to rotate the indicator needle via magnetic force, the indicator needle being rotatable by the magnetic force,
   wherein:
   the display panel is between the needle module and the driving module, a region of the display panel overlapping the rotation axis of the indicator needle including no holes,
   the needle module includes a first rotating part, a first magnet in the first rotating part, a second rotating part, and a second magnet in the second rotating part, and the indicator needle includes first and second needles which rotate in accordance with rotation of the first and second rotating parts, respectively,
   driving module on a surface of the display panel includes a first rotating driving part, a first driving magnet in the first rotating driving part, a second rotating driving part, and a second driving magnet in the second rotating driving part,
   the first magnet has a first-pole and a second-pole, and the second magnet has a first-pole and a second-pole,
   the first driving magnet has a first-pole and a second-pole, and the second driving magnet has a first-pole and a second-pole, and
   a net attractive force is applied between the first-pole of the first magnet and the second-pole of the first driving magnet, a net attractive force is applied between the first-pole of the second magnet and the second-pole of the second driving magnet, such that the first rotating part rotates when the first rotating driving part rotates, and the second rotating part rotates when the second rotating driving part rotates.

2. The display apparatus as claimed in claim 1, wherein an imaginary line along a net attractive force between the first magnet of the first rotating part and the first driving magnet of the first rotating driving part, and an imaginary line along a net attractive force between the second magnet of the second rotating part and the second driving magnet of the second rotating driving part do not cross each other.

3. The display apparatus as claimed in claim 1, wherein the first rotating part and the second rotating part are stacked on the display panel, and the second rotating part is between the first rotating part and the display panel.

4. The display apparatus as claimed in claim 1, wherein the needle module further comprises a third rotating part and a third magnet in the third rotating part.

5. The display apparatus as claimed in claim 1, wherein the display panel includes:
   a display area to display an area, the display area having a circular shape; and
   a first peripheral area adjacent to and surrounding the display area.

6. The display apparatus as claimed in claim 5, wherein the display panel further comprises a second peripheral area in a center of the display area, an image is not displayed in the second peripheral area, and the needle module being on and overlapping the second peripheral area.

7. The display apparatus as claimed in claim 5, wherein the driving module is moveable on a surface of the display panel along a linear direction, and the needle module is moveable on the display panel in accordance with movement of the driving module.

8. The display apparatus as claimed in claim 1, wherein the indicator needle is a clock hand.

9. A display apparatus, comprising:
a circular display panel;
a first rotating part on an upper surface of the circular display panel, the first rotating part being connected to a first indicator needle; and
a first rotating driving part on a lower surface of the circular display panel to rotate the first rotating part via magnetic force,
wherein a region of the circular display panel overlapping a rotation axis of the first indicator needle includes no holes therethrough;
a second rotating part on the circular display panel, and connected to a second indicator needle; and a second rotating driving part on the lower surface of the circular display panel to rotate the second rotating part via magnetic force,
wherein the first and second rotating parts rotate about a rotation axis, magnets of the first and second rotating parts overlapping different portions of the circular display panel, and
wherein the first and second indicator needles are hour and minute hands of a clock, respectively.

10. The display apparatus as claimed in claim 9, wherein a line along a net attractive force between the first rotating part and the first rotating driving part and a line along a net attractive force between the second rotating part and the second rotating driving part do not cross each other.

11. The display apparatus as claimed in claim 9, wherein the first rotating driving part is moveable on the lower surface of the circular display panel, and the first rotating part is moveable on the upper surface of the circular display panel according to movement of the first rotating driving part only by the magnetic force.

12. The display apparatus as claimed in claim 11, wherein the first rotating driving part is in a center of the circular display panel in a clock mode, and the first rotating driving part is moveable to a periphery of the circular display panel in a display mode.

* * * * *